United States Patent
Westphal et al.

(10) Patent No.: US 10,148,721 B2
(45) Date of Patent: Dec. 4, 2018

(54) VIDEO STREAM NETWORK CODING IN INFORMATION CENTRIC NETWORKS

(71) Applicant: Futurewei Technologies, Inc., Plano, TX (US)

(72) Inventors: Cedric Westphal, San Francisco, CA (US); Abinesh Ramakrishnan, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 129 days.

(21) Appl. No.: 15/414,781

(22) Filed: Jan. 25, 2017

(65) Prior Publication Data

US 2018/0159915 A1    Jun. 7, 2018

Related U.S. Application Data

(60) Provisional application No. 62/430,630, filed on Dec. 6, 2016.

(51) Int. Cl.
| | |
|---|---|
| G06F 15/16 | (2006.01) |
| H04L 29/06 | (2006.01) |
| H04L 29/08 | (2006.01) |

(52) U.S. Cl.
CPC ............ H04L 65/607 (2013.01); H04L 67/02 (2013.01); H04L 67/1097 (2013.01)

(58) Field of Classification Search
USPC .......................... 709/217, 218, 219, 231, 246
See application file for complete search history.

(56) References Cited

U.S. PATENT DOCUMENTS

| | | | | |
|---|---|---|---|---|
| 9,002,921 | B2 * | 4/2015 | Westphal | ............... H04L 67/06 709/202 |
| 9,866,605 | B2 * | 1/2018 | Begen | .................... H04N 19/46 |
| 2012/0331106 | A1 * | 12/2012 | Ramamurthy | ... H04N 21/23432 709/218 |

(Continued)

OTHER PUBLICATIONS

Ramakrishnan, Abinesh, et al., "Adaptive Video Streaming over CCN with Network Coding for Seamless Mobility," IEEE ISM, Dec. 2016, 5 pages.

(Continued)

*Primary Examiner* — Liang Che A Wang
(74) *Attorney, Agent, or Firm* — Vierra Magen Marcus LLP

(57) ABSTRACT

The disclosure relates to technology for network coding a video stream in an information centric network. A network node breaks a media segment (e.g., a video segment) into chunks. The chunks for one media segment are then encoded into network encoded chunks, each of which may be a linear combination of the chunks for that media segment. Thus, a number of network encoded chunks for a media segment are generated. These network encoded chunks may be provided to a client in response to a request for content in an information centric network (ICN). When the client receives enough network encoded chunks, the client decodes them to produce the original chunks for that media segment. The client may perform bit-rate adaptation based on the time it takes to receive a media segment. The client may view the communication interfaces as a logical communication link upon which to perform rate adaptation.

18 Claims, 11 Drawing Sheets

(56) References Cited

U.S. PATENT DOCUMENTS

| | | | | |
|---|---|---|---|---|
| 2013/0042015 | A1* | 2/2013 | Begen | H04N 19/46 |
| | | | | 709/231 |
| 2013/0227166 | A1* | 8/2013 | Ravindran | H04L 67/327 |
| | | | | 709/238 |
| 2015/0269633 | A1* | 9/2015 | Mahadevan | G06Q 30/0275 |
| | | | | 705/71 |
| 2016/0065685 | A1* | 3/2016 | Kurihara | H04L 1/08 |
| | | | | 714/748 |
| 2017/0099625 | A1* | 4/2017 | Li | H04W 28/08 |
| 2017/0105044 | A1* | 4/2017 | Ravindran | H04N 21/4663 |

OTHER PUBLICATIONS

Liu, Yaning, et al., "Dynamic Adaptive Streaming over CCN: A Caching and Overhead Analysis," Proceedings of the IEEE international Conference on Communication (ICC), Jun. 2013, 5 pages.

Grandl, Reinhard, et al., "On the Interaction of Adaptive Video Streaming with Content-Centric Networking," 20th International Packet Video Workshop (PV), Dec. 2013, 8 pages.

Montpetit, Marie-Jose, et al., "Network Coding Meets Information-Centric Networking: An Architectural Case for Information Dispersion Through Native Network Coding," NoM' 12, Jun. 2012, 6 pages.

Saltarin, Jonnahtan, et al., "NetCodCCN: a Network Coding approach for Content-Centric Networks," The 35th Annual IEEE International Conference on Computer Communications, IEEE INFOCOM, Apr. 2016, 10 pages.

Westphal, Cedric, et al., "Adaptive Video Streaming over Information-Centric Networking (ICN)," Internet Research Task Force (IRTF), Aug. 2016, 40 pages.

Yu, Yu-Ting, et al., "Congestion-Aware Edge Caching for Adaptive Video Streaming in Information-Centric Networks," 12th Annual IEEE Consumer Communications and Networking Conference (CCNC), Jan. 2015, 9 pages.

* cited by examiner

US 10,148,721 B2

VIDEO STREAM NETWORK CODING IN INFORMATION CENTRIC NETWORKS

CLAIM OF PRIORITY

The present application claims priority from U.S. Provisional Patent Application No. 62/430,630, entitled "VIDEO STREAM NETWORK CODING IN INFORMATION CENTRIC NETWORKS," by Westphal et al., filed Dec. 6, 2016, incorporated by reference herein in its entirety.

BACKGROUND

In the traditional TCP/IP (Transmission Control Protocol/Internet Protocol) model, the client requesting some content needs to first map the URL (Uniform Resource Locator) in the name of the content to a server. This server will mostly stay the same for the length of the session. The session is actually bound to this server, and the session's goal is to transfer the specific content held from this server. In such host-centric networking paradigm, the core networking primitives revolve around naming hosts and network interfaces. Network devices can only forward packets according to the destination addresses.

Recently, information-centric networks (ICN) have been proposed. Examples of ICNs include, but are not limited to, Named Data Networking (NDN), Content Centric Networking (CCN), Content Oriented Networking (CON), Data Oriented Networking (DON), and Content Based Networking (CBN). Unlike traditional host-centric networking, information is directly named in ICNs. Thus, ICNs allow a client device to focus on the data needed, as opposed to referencing a specific location from which the data may be retrieved.

For example, in CCN, a client node may send an interest packet to the network when the client wants to access a piece of a content object. The network then forwards the interest packet using the name of the interest for routing. Once the interest packet reaches a cache holding a match for the interest, a content return packet may be sent back. The content return packet may retrace the path followed by the interest packet in the reverse direction to the client node which requested the content. Each content return packet may be a chunk of the content object.

BRIEF SUMMARY

In a first embodiment, an apparatus comprises a non-transitory memory storage comprising instructions and one or more processors in communication with the memory. The one or more processors execute the instructions to access a plurality of segments of video data, each of which covers a time range and has a bit rate. The one or more processors execute the instructions to break ones of the segments into chunks. For each of the segments, the one or more processors execute the instructions to generate network encoded chunks that are linear combinations of the chunks for that segment. The one or more processors execute the instructions to provide the network encoded chunks over a network in response to requests for network encoded chunks associated with the plurality of segments.

In a second embodiment, in accordance with the first embodiment, the one or more processors execute the instructions to break different ones of the plurality of segments into different numbers of chunks based on the bit rate for the segment.

In a third embodiment, in accordance with any of the first through second embodiments, each of the plurality of segments has a quality representation. The one or more processors execute the instructions to break different ones of the plurality of segments into different numbers of chunks based on the quality representation for the segment.

In a fourth embodiment, in accordance with any of the first through third embodiments, to provide the network encoded chunks over a network, the one or more processors execute the instructions to include information with each of the network encoded chunks that defines a linear combination of chunks for a given segment from which the network encoded chunk was formed.

In a fifth embodiment, in accordance with any of the first through fourth embodiments, the plurality of segments of video data are HTTP-based file segments, each segment including a short interval of video playback.

In a sixth embodiment, in accordance with any of the first through fifth embodiments, the chunks are content centric networking (CCN) chunks.

In a seventh embodiment, a method for providing content in an information centric network (ICN) comprises accessing a plurality of segments of video data, each of which covers a time window and has a bit rate; breaking ones of the segments into ICN chunks; for each of the segments, generating network encoded ICN chunks that are linear combinations of the ICN chunks for that segment; and providing the network encoded ICN chunks over the information centric network (ICN) in response to requests for at least one of the network encoded ICN chunks.

In an eight embodiment in accordance with the seventh embodiment breaking ones of the segments into ICN chunks comprises breaking different ones of the plurality of segments into different numbers of chunks based on the bit rate for the segment.

In a ninth embodiment in accordance with any of the seventh through eighth embodiments each of the plurality of segments has a quality representation. The breaking ones of the segments into ICN chunks comprises breaking different ones of the plurality of segments into different numbers of chunks based on the quality representation for the segment.

In a tenth embodiment in accordance with any of the seventh through ninth embodiments providing the network encoded ICN chunks comprises including information with each of the network encoded ICN chunks that defines a linear combination of the ICN chunks for a given segment from which the network encoded ICN chunk was formed.

In an eleventh embodiment in accordance with any of the seventh through tenth embodiments the plurality of segments of video data are HTTP-based file segments, each segment including a short interval of video playback.

In a twelfth embodiment in accordance with any of the seventh through eleventh embodiments the ICN chunks are content centric networking (CCN) chunks.

In a thirteenth embodiment in accordance with any of the seventh through twelfth embodiments, the method further comprises accessing a request for a video segment from a video client of a client system; converting the request for the video segment into a request for an interest in the ICN; forwarding interest requests to the ICN over a plurality of communication interfaces of the client system, wherein the requests for at least one of the network encoded ICN chunks are received by way of a first of the communication interfaces; receiving network encoded ICN chunks over ones of the plurality of communication interfaces in response to the interest requests; decoding the network encoded ICN chunks into ICN chunks; assembling the ICN chunks into the video segment; and providing the video segment to the video client.

In a fourteenth embodiment in accordance with any of the seventh through thirteenth embodiments, the method further comprises receiving a first network encoded chunk over the first communication interface; receiving a second network encoded chunk over a second of the communication interfaces; forming an ICN chunk from the first network encoded chunk and the second network encoded chunk; and performing video bit-rate adaptation based on the time between a request for the video segment and the time the video segment is re-assembled, wherein the video segment was re-assembled based on the first network encoded chunk and the second network encoded chunk.

In a fifteenth embodiment, an apparatus comprises a non-transitory memory storage comprising instructions; a plurality of communication interfaces; and one or more processors in communication with the plurality of communication interfaces and the memory. The one or more processors execute the instructions to access a request for a video segment from a video client; convert the request for the video segment into a request for an interest in an information centric network (ICN); forward interest requests to the ICN over the plurality of communication interfaces; receive network encoded ICN chunks over ones of the plurality of communication interfaces in response to the interest requests; decode the network encoded ICN chunks into ICN chunks; assemble the ICN chunks into the video segment; and provide the video segment to the video client.

In a sixteenth embodiment in accordance with the fifteenth embodiment the request for a video segment is a request for an HTTP-based video segment.

In a seventeenth embodiment in accordance with any of the fifteenth though sixteenth embodiments the ICN is a content centric network (CCN).

In an eighteenth embodiment in accordance with any of the fifteenth though seventeenth embodiments the one or more processors execute the instructions to: receive a first network encoded chunk over a first of the communication interfaces; receive a second network encoded chunk over a second of the communication interfaces; and form an ICN chunk from the first network encoded chunk and the second network encoded chunk.

In an nineteenth embodiment in accordance with any of the fifteenth though eighteenth embodiments the one or more processors execute the instructions to perform video bit-rate adaptation based on the time between a request for the video segment and the time the video segment is re-assembled, wherein the video segment was re-assembled based on the first network encoded chunk and the second network encoded chunk.

In an twentieth embodiment in accordance with any of the fifteenth though nineteenth embodiments the one or more processors execute the instructions to perform video bit-rate adaptation based on the time between a request for the video segment and the time the video segment is re-assembled, wherein the apparatus does not send a request for the video segment over a communications network and does not receive the video segment over any of the plurality of communication interfaces.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

DETAILED DESCRIPTION

The disclosure relates to technology for network coding a media object (e.g., a video stream) in an information centric network. In one embodiment, a network node breaks a media segment (e.g., a video segment) into chunks. The chunks for one media segment are then encoded into network encoded chunks, each of which may be a linear combination of the chunks for that media segment. Thus, a number of network encoded chunks for a media segment are generated. These network encoded chunks may be provided to a client in response to a request for content in an information centric network (ICN).

In one embodiment, a client requests the network encoded chunks over a number of communication interfaces (e.g., Wi-Fi, cellular, etc.). The client may request network encoded chunks associated with a specific media segment. When the client receives enough network encoded chunks, the client decodes them to produce the original chunks for that media segment.

In one embodiment, the client performs bit-rate adaptation based on the time it takes to receive a media segment. Note that the network encoded chunks for that media segment may arrive over different communication interfaces. In effect, the client may view the mish-mash of communication interfaces as a logical communication link upon which to perform rate adaptation. Note that the client need not measure the time it takes to receive individual network encoded chunks over the individual communication interfaces.

Moreover, if the client loses communication over one of the communication interfaces, suitable network encoded chunks for re-creating the media segment may be received over a different communication interface. Hence, a mobile client is provided with a seamless experience.

Figure 1A:
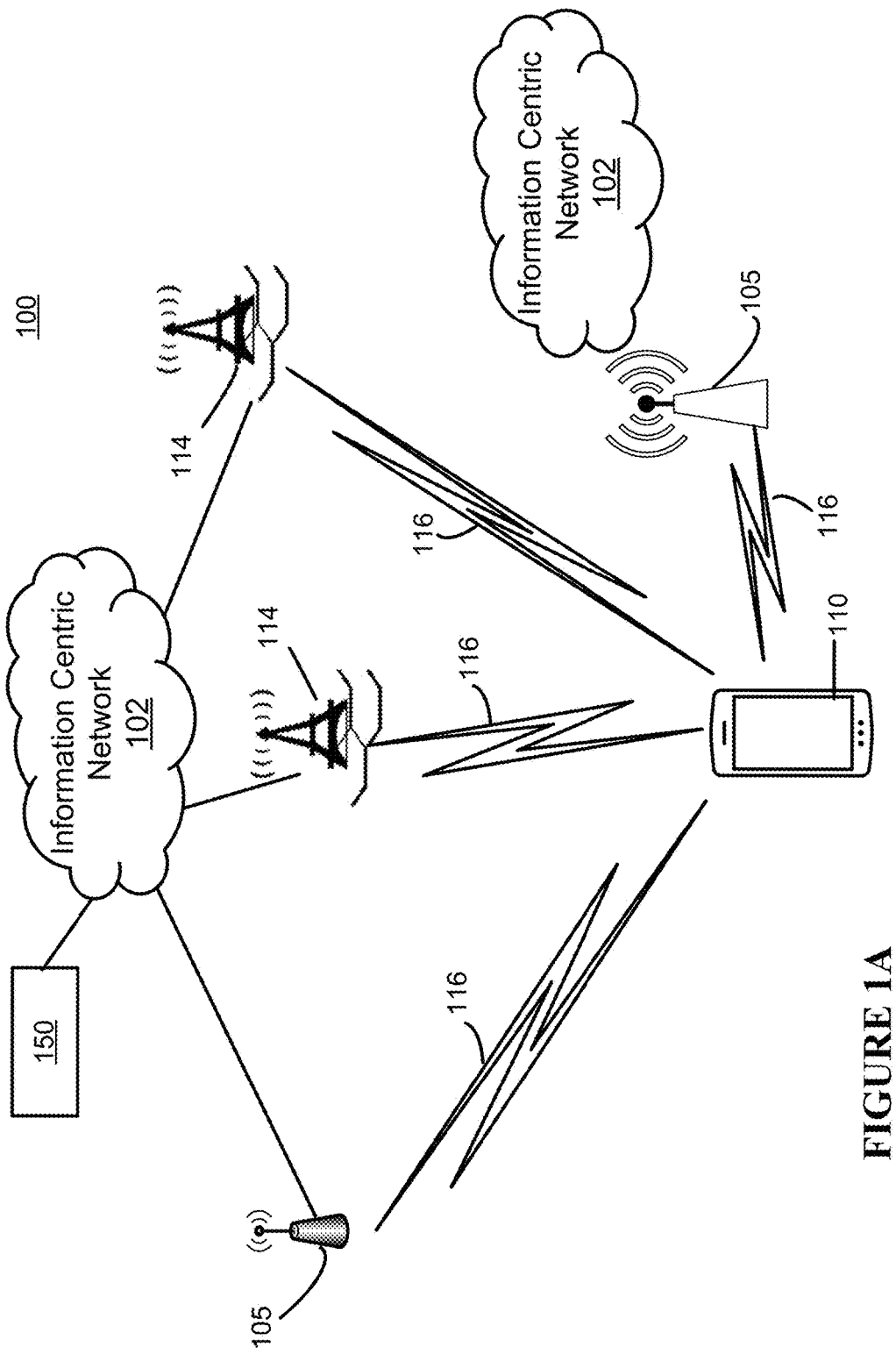
FIG. 1A illustrates an architecture of a wireless communication system in which the present technology may be implemented.

FIG. 1A illustrates an example communication system 100 in which embodiments may be practiced. As illustrated, the communication system 100 includes, but is not limited to, information centric network 102, base stations 114, wireless access points 105, computer system 150, and user equipment (UE) 110.

The UE 110 may be configured to operate and/or communicate in the communication system 100. For example, the UE 110 may be configured to transmit and/or receive wireless signals or wired signals. The UE 110 has one or more interfaces configured to communicate with one or more of the base stations 114 and/or wireless access points 105. The UE 110 is able to communicate over one or more air interfaces 116 using wireless communication links. The air interfaces 116 may utilize any suitable radio access technology. Note that in some embodiments the UE 110 is able to communicate simultaneously over multiple air interfaces 116. Also, the UE 110 may be a mobile communication device. In this case, the UE 110 may lose or gain communication with a base station 114 or access point 105 as the UE 110 moves. The UE 110 may also be configured to communicate over one or more wireline interfaces in order to access an ICN 102.

The UE 110 may have a processor, a memory (which may or may not be non-transitory), a transceiver, and an antenna (not shown). In particular embodiments, some or all of the functionality described herein as being provided by the UE may be provided by the UE processor executing instructions stored on the memory. Alternative embodiments of the UE may include additional components that may be responsible for providing certain aspects of the UE's functionality, including any of the functionality necessary to support the embodiments of the present disclosure.

The UE 110 represents any suitable end user device and may include such devices (or may be referred to) as a user equipment/device (UE), mobile wireless communication device, wireless transmit/receive unit (WTRU), mobile station, fixed or mobile subscriber unit, pager, cellular telephone, personal digital assistant (PDA), smartphone, laptop, computer, touchpad, or consumer electronics device.

Note that the UE 110 could be operated under a variety of mobility scenarios. For example, the UE might be operated by a pedestrian (e.g., the user is walking). As another example, the user might be operating the UE 110 in a moving vehicle (e.g., automobile, train, boat, etc.). The user might be operating the UE 110 in a variety of static locations (e.g., home, coffee shop, work, etc.) It is challenging to efficiently provide data transfer (such as video) to the UE 110 under such a variety of scenarios.

The information centric network 102 may include the hardware and software that provides an information centric network. In one embodiment, the information centric network 102 provides a wireless network. The information centric network 102 may include one or more computer systems 150. The computer system 150 is a server, in one embodiment. The information centric network 102 may provide wireless communication to UE 110 in accordance with a wireless communication protocol. The information centric network 102 can include a collection of gateways through which wireless traffic passes. The ICN 102 may be compliant with an evolved packet core (EPC). However, the ICN 102 is not required to be EPC compliant. In one embodiment, the ICN 102 includes a Serving Gateway (Serving GW), a Packet Data Network Gateway (PDN GW), a Mobility Management Entity (MME) and a Home Subscriber Server (HSS). However, it is not required to include these elements in the ICN 102.

In general, the communication system 100 enables multiple wireless users to transmit and receive data and other content. The communication system may implement one or more channel access methods, such as code division multiple access (CDMA), time division multiple access (TDMA), frequency division multiple access (FDMA), orthogonal FDMA (OFDMA), or single-carrier FDMA (SC-FDMA).

Each base station 114 is configured to wirelessly interface with the UE 110 to enable access to the ICN 102. Each base station 114 operates to transmit and/or receive wireless signals within a particular geographic region or area, sometimes referred to as a "cell." In some embodiments, multiple-input multiple-output (MIMO) technology may be employed having multiple transceivers for each cell.

Each base station 114 may include one or more radio access nodes. For example, the base stations 114 may include one or more of several well-known devices, such as a base transceiver station (BTS), a Node-B (NodeB), an evolved NodeB (eNodeB), a Home NodeB, a Home eNodeB, a site controller, an access point (AP), or a wireless router, or a server, router, switch, or other processing entity with a wired or wireless network.

It is contemplated that the system 100 may use multiple channel access functionality, including such schemes as described above. In particular embodiments, the base stations 114 and UE 110 are configured to implement the Long Term Evolution wireless communication standard (LTE), LTE Advanced (LTE-A), 5G and/or LTE Broadcast (LTE-B). The base stations and UE may be configured to implement LTE-unlicensed (LTE-U) or License assisted access LTE (LAA-LTE). The base stations 114, wireless access points 105, and UEs may be configured to implement Wi-Fi. In other embodiments, the base stations and UEs are configured to implement UMTS (Universal Mobile Telecommunications Service), HSPA (High Speed Packet Access), or HSPA+ standards and protocols. Note that a mix of any of these schemes and wireless protocols may be used. Of course, other multiple access schemes and wireless protocols may be utilized.

In one embodiment, wireless APs 105 include, but are not limited to, a connection point (a mmW CP) or a base station capable of mmW communication (e.g., a mmW base station). In one embodiment, APs 105 may transmit and receive signals in a frequency range, for example, from 6 GHz to 100 GHz, but are not required to operate throughout this range. Wireless communication signals in this range may suffer from high path loss. Beamforming may be used to overcome such losses. Beamforming focuses transmitted energy into a narrow beam. Both the APs 105 and the UE 110 may use beamforming to communicate with each other. The APs 105, the UE 110, and at least some of the base stations 114 may have a phased-array beam antenna for beamforming. A transmitting and a receiving device can only communicate with each other when the phased array beam antennas of the transmitting and receiving device are mutually aligned. The wireless APs 105 are not limited to mmW communication. A wireless APs 105 may be a Wi-Fi access point, BLUETOOTH access point, IEEE 802.11 access point, for example.

Note that the UE 110 could connected under a variety of access points. Moreover, such access points can change while the user is accessing some data (e.g., a video file) For example, the UE 110 connect to a macro cell, pico cell, WiFi AP, etc. It is challenging to efficiently provide data transfer (such as video) to the UE 110 under such a variety of scenarios.

Thus, the UE 110 may have interfaces such as, but not limited to, 5G, 4G/LTE, WiFi. The UE 110 may connect to access points such as, but not limited to a macrocell, picocell, WiFi Access Point. The UE 110 may undergo a wide variety of mobility conditions (e.g., static, pedestrian, vehicular). In some embodiments, network encoding of chunks of video content is performed to help provide for efficient transfer of data from an ICN to the UE 110.

Although FIG. 1A illustrates one example of a communication system, various changes may be made to FIG. 1A. For example, the communication system 100 could include any number of UEs 110, base stations 114, access points 105, computer systems 150, or other components in any suitable configuration.

Figure 1B:
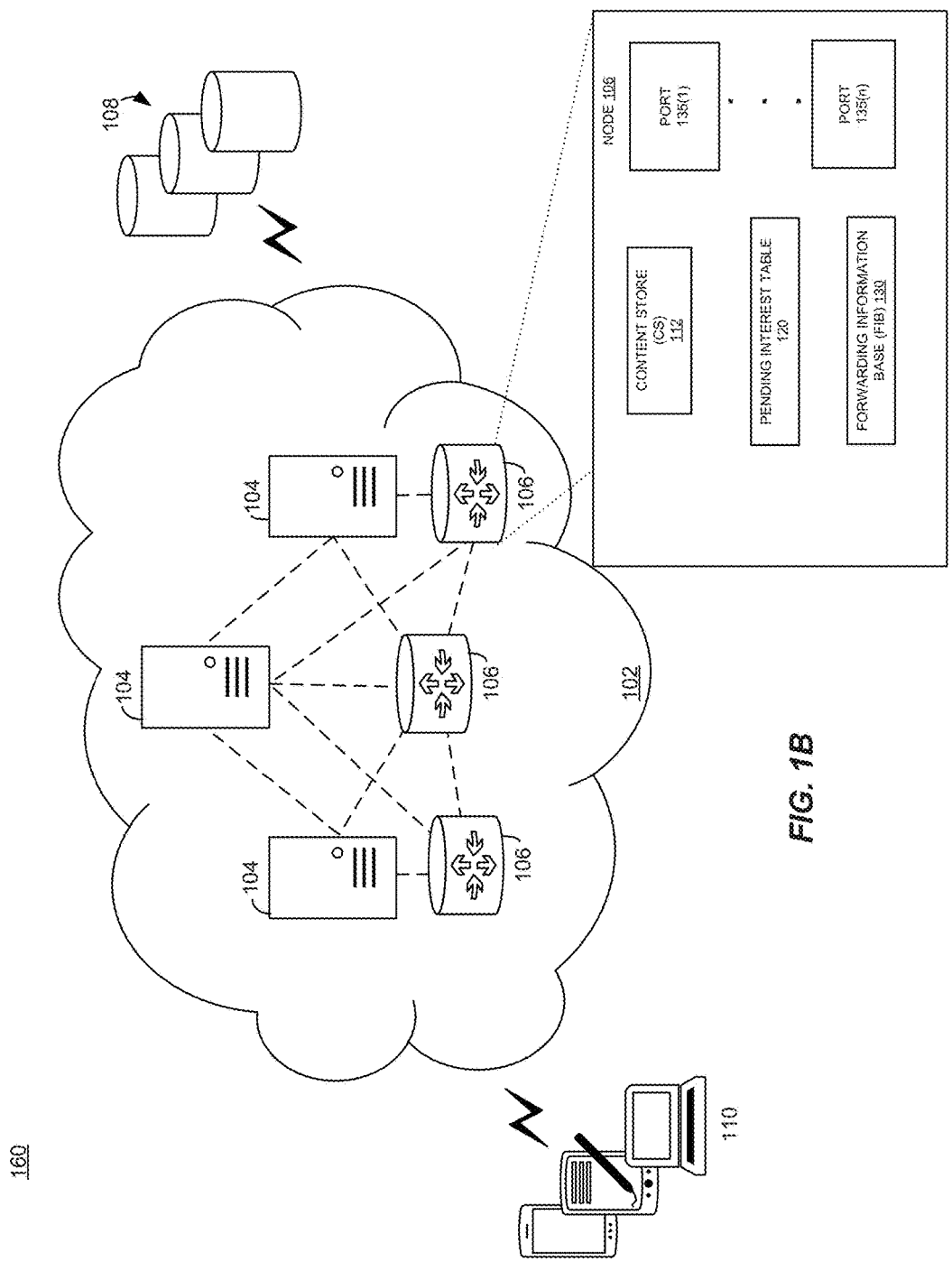
FIG. 1B illustrates a network environment to provide content as requested by different users in an information centric network (ICN).

FIG. 1B illustrates a network environment 160 to provide content as requested by different users in an information centric network (ICN). The network environment 160 shows further details of one embodiment of an ICN 102, which may be used for the ICN 102 in the environment of FIG. 1A. The ICN 102 may be, but is not limited to, a Named Data Network (NDN), Content Centric Network (CCN), Content Oriented Network (CON), Data Oriented Network (DON), or Content Based Network (CBN). The network environment 160 may include the ICN 102 having controllers, such as ICN managers 104. The ICN managers 104 may be, for example, a network entity that may have control over a set of network resources in a data plane. In one embodiment, the ICN managers 104 maintain a synchronized record of content hosted by different network entities in the ICN 102. For example, the ICN functionalities may include ICN name resolution, routing, and management. The ICN managers 104 may be deployed in a distributed or in a centralized or in a hybrid manner depending upon the Internet Service Providers (ISP).

In one embodiment, the ICN is compliant with a CCN protocol. A CCN protocol emphasizes content by making it directly addressable and routable. Endpoints communicate based on named data instead of IP addresses. CCN is characterized by the basic exchange of content request messages (called "Interests") and content return messages (called "Content Objects"). The Interest message is used to request data by name. Specifically, an Interest message can identify a chunk of content to retrieve. Alternatively, an Interest message can provide a name prefix and other qualifications to restrict what data is acceptable from the collection named by the prefix. Herein, the term "interest packet" includes, but is not limited to an interest message. The Content Object is used to supply data. Herein, the term "data packet" includes, but is not limited to the message that returns a Content Object.

Communication using the CCN protocol is receiver-controlled. A Consumer of data transmits an Interest message over available connectivity and any party receiving the message and having data that matches, or satisfies, the request (according to the specifications in the Interest Message) may transmit a matching Content Object message. Data is only transmitted in response to an Interest that matches the Data. An Interest message may be transmitted using broadcast or multicast facilities of the underlying transport in order to reach many potential sources of data with minimal bandwidth cost.

ICN 102 may also include routers (or nodes) 106, which may include storage to cache content as it propagates through the ICN 102. The routers 106 may also be communicatively coupled with the ICN managers 104 and may be configured to process requests received from users for accessing the content via user devices 110, such as a mobile device or computer.

The routers 106 may collaborate for caching content with one or more other routers 106 in the network, such as an ICN, which may be configured as follows. A router 106 may comprise a content store (CS) 112, pending interest table (PIT) 120, forwarding information base (FIB) 130, and input/output (I/O) ports 135(1) to 135(n). The I/O ports are configured to receive and transmit data from/to other nodes. The CS 112 may be used (e.g., in non-transitory memory storage) to cache (for relatively short time) or store (for relatively longer time) content data. The CS 112 may also receive and associate interests (user requests for content) with corresponding content data (requested content).

The FIB 130 may be any data structure (e.g., a table, list, or database) used to associate content with corresponding ports (for next hops) on which the interests and content data are received and forwarded. The FIB 130 entries may indicate the next hops on which content (interests and data) may be forwarded. The FIB 130 may be a data structure or a sub-data structure (e.g. a data structure within a data structure, such as a table, list, or database which may be maintained and operated (to process content interest and data) at a data plane or forwarding plane. The FIB 130 may be stored in any non-transitory memory storage. The data plane may comprise operations for transferring content information (interest and data) in the CON, and the control plane may comprise operations related to controlling network operations including the data plane operations. The data structures above may be stored and maintained in a storage or memory unit of the router 106.

The PIT 120 may be any data structure (e.g., a table, list, or database) used to record and keep track of the received interests (requests for content) that are being served or pending (until the corresponding requested content data is received). The interests may be associated in the PIT 120 with the next hops (or next hop interfaces or faces) of the collaborative caching router 106 on which the interests were received.

To carry out the Interest and Data packet forwarding functions, the router 106 maintains the three data structures described above, namely: (1) a CS 112 acting as a temporary cache of Data packets the router has received, which cached Data packets may be used to satisfy future Interests; (2) a PIT 120 to store all the Interests that a router has forwarded but not satisfied yet, where each PIT entry records the data name carried in the Interest, together with its incoming and outgoing interface(s); and (3) a FIB 130 as a routing table which maps name components to interfaces, and is populated by a name-prefix based routing protocol, and can have multiple output interfaces for each prefix. Additionally, the router 106 may include forwarding policies and rules to handle forwarding of packets.

In one example embodiment, when the router 106 receives an Interest packet (incoming interest), which includes for example the name of the content that the requester (client) wants to request, the router 106 first checks to determine if there is a locally cached copy of the content in the CS 112. If a locally cached copy of the content exists in the CS 112, the router 106 can reply to the Interest by sending the content copy to the incoming face of the Interest.

If no locally cached copy of the content exists, the content router 106 checks to determine if there are pending interests in the PIT 120 with the same content name. If the same Interest exists and is pending, then the incoming port of the new Interest is added to the port list for the content name in the PIT 120. Accordingly, the new interest is no longer required to be forwarded.

Otherwise, the router 106 forwards the Interest by performing a lookup, such as a longest-match lookup, in the FIB 130 based on the content name. The Interest is then stored in the PIT 120. If no matched entry is maintained in the FIB 130, then the Interest is forwarded to the ports other than the incoming ports.

The network environment 160 may further include data stores 108, which may store the content or collections of content, such as files, images, videos, and the like. Accordingly, the managers 104 and the routers 106 may communicate with the data stores 108 to provide the content to different users. Additionally, the network environment 160 may include one or more user devices 110, including for example and without limitation, desktop computers, handheld devices, laptops or other portable computers, network computers, mobile phones, landline phones, and the like.

In one embodiment, the ICN 102 is a NDN/CCN. Note that NDN/CCN does not follow the current IP model for data transfer. In the traditional TCP/IP model, the UE 110 requesting some content needs to first map the URL in the name of the content to a server. This server will mostly stay the same for the length of the session. The session is actually bound to this server, and the session's goal is to transfer the specific content held from this server. Upon a mobility event of the UE (for instance, connecting from a LTE interface to a WiFi network), the session has to be reset and it will resume from the new location with the previous server/copy of the content.

Tearing down and resetting the session is inefficient along several axes. There is no reason the server is still the most appropriate server after a mobility event. The tear down and the reset of the TCP connection is time-consuming. The session is tied up to an interface and a path.

Note that in an ICN 102 there is not a session to carry over upon a change of providing data from one source to providing data from another source. Hence, in the event that the UE 110 is mobile, seamless mobility is provided for in accordance with embodiments. CCN/NDN identifies content by its name instead of pointing to the physical location of the content. This makes it possible to store the content anywhere in the network 102 and to connect directly to the content, without binding with a server first. CCN/NDN also removes the session-oriented nature of TCP by adopting a per chunk data transfer. This allow data chunks to be retrieved from different locations, potentially in parallel. In the a mobility event, the network could seamlessly forward new content requests (termed "interests" in CCN terminology) to a nearby copy of the content on a different host, rather than sticking with the previously identified copy.

The CCN/NDN architecture has a potential for allowing users to exploit multi-path connectivity available in the network to multiple content locations, as the end user nodes and the intermediate nodes can simultaneously transmit interest over multiple network interfaces to retrieve segments of the requested content. However, to fully achieve this potential, embodiments use network coding to leverage the multiple paths and multiple content locations.

Note that in an ICN, since the consumer (e.g., UE 110) requests content by name, if the UE 110 is mobile, the ICN 103 may locate another copy of the content upon a mobility event. For example, if the user (with the UE 110) is traveling in an automobile, the ICN 102 may locate a server that is closer to the UE 110. This might or might not be through a different communication interface (e.g., this might be a handoff from one macrocell to another macrocell in an LTE network, or from a macrocell in an LTE network to a W-Fi AP). Moreover, note that there is not a session to carry over in an ICN. This differs from IP, in which there is a session to carry over upon a mobility event. Embodiments disclosed herein use network coded ICN, which takes advantage of the multiple communication interfaces of the UE 110. While this applies to mobility events, it is not limited to mobility events. For example, even if the UE 110 is stationary, the multiple communication interfaces can be used to provide data (e.g., video) from the ICN 102.

In one embodiment, UE 110 sends interest for network encoded chunks to all its interfaces. The interest is not for a specific chunk, but for one in a subset of all chunks. The interests are forwarded to a node that holds the content. It responds with a random linear combination of the chunks in the requested range. Once the UE 110 has enough network encoded chunks (NCCs), it decodes them to retrieve the original content. Intermediate node may or may not cache the NCCs. They may hold onto them until they can decode them, for instance. It creates a point-to-multipoint connection over the several interfaces.

Although FIG. 1B illustrates one example of a network environment 160, various changes may be made to FIG. 1B. For example, the network environment 160 could include any number of UEs 110, nodes 106, managers 104 data stores 108, or other components in any suitable configuration.

Figure 2:
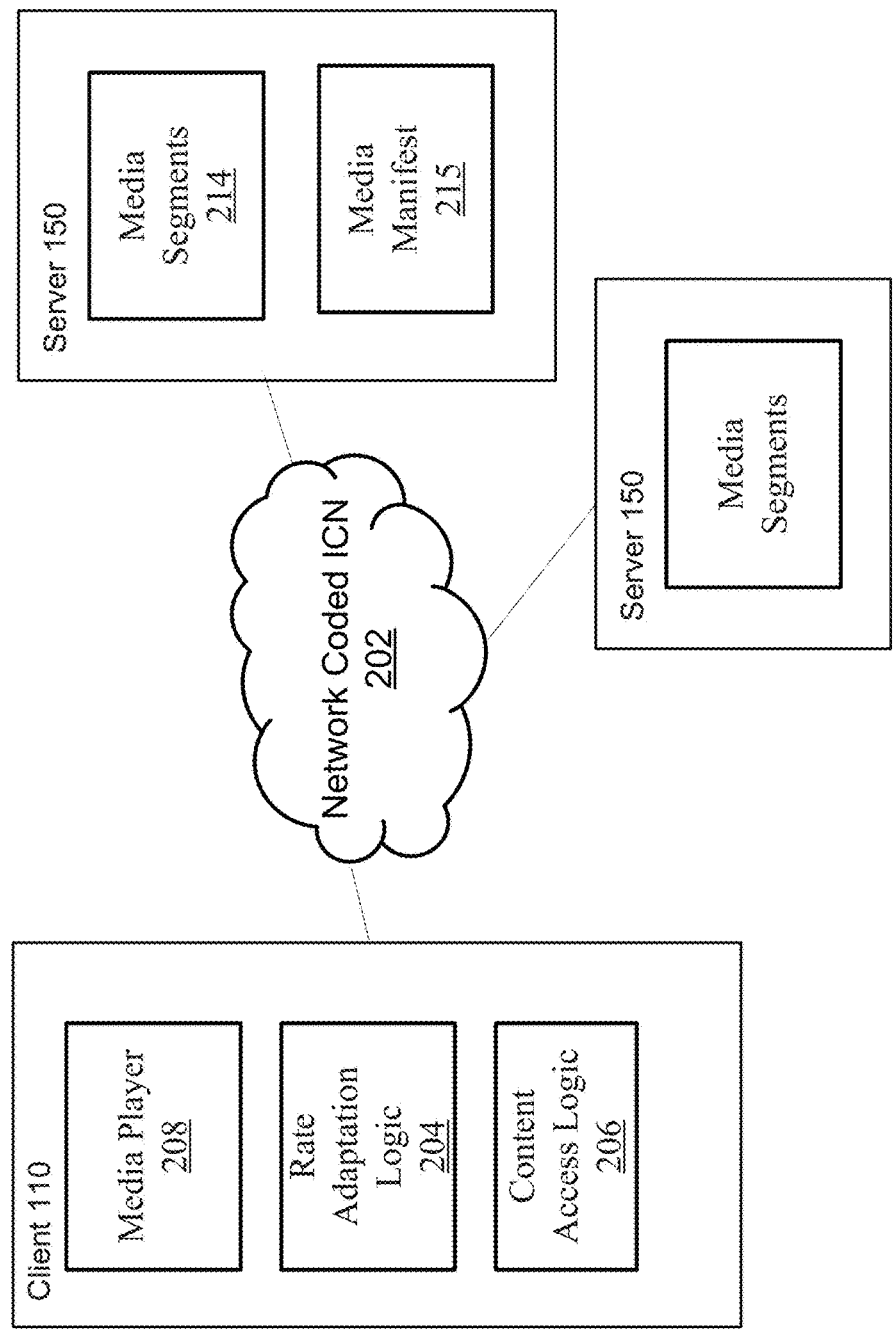
FIG. 2 is a block diagram of one embodiment of a system for providing network coded video to a client (also referred to as UE).

FIG. 2 is a block diagram of one embodiment of a system for providing network coded video to a client 110 (also referred to as UE). Each server 150 has stored thereon media segments for a media object. The media object may be, for example, a video stream. The entire media object may be quite lengthy. Each media segment may contain some short interval of playback content. The media segments are each for some specific window of time of the media object, in one embodiment. Also, each media segments is for some specific rate, in one embodiment. Thus, a given media segment is for some time window at a certain rate, in one embodiment. Note that for a given time window there may be media segments available for multiple different bit rates.

In some embodiments, the media segments 214 are small HTTP-based file segments, each segment including a short interval of video playback. The media segments could be compliant with one of a variety of protocols. In one embodiment, the media segments are complaint with Dynamic Adaptive Streaming over HTTP (DASH). DASH may also be referred to as MPEG-DASH. DASH is an adaptive bitrate streaming technique. The media segments 214 are not limited to DASH. In one embodiment, the media segments 214 are compliant with HTTP Live Streaming (HLS), which is an HTTP-based media streaming communications protocol. The media segments 214 could be compliant another protocol, but are not required to be compliant with any existing protocol.

The media manifest 215 contains a description of the media object. For example, the media manifest 215 may describe what media segments 214 are available, and some information about the segments. The media manifest 215 may include one or more of the following for each segment: the time range within the media object, bit rate, and/or video resolution. The media manifest 215 is referred to as a media presentation description (MPD), in one embodiment. A Media Presentation Description (MPD) describes segment information, the relationship between the contents' media segments and the associated bitrate, resolution, and timeline. For example, the MPD may be in compliance with a DASH protocol. In one embodiment, the media manifest 215 is an XML file. The media manifest 215 may be provided to the client 110 in order for the client 110 to be able to select desired media segments for the media object, at a desired bit rate.

The network coded ICN 102 may be, but is not limited to, a Named Data Network (NDN), Content Centric Network (CCN), Content Oriented Network (CON), Data Oriented Network (DON), or Content Based Network (CBN). Moreover, the ICN uses network coding to provide data packets to the client 110, in one embodiment. In some embodiments, the network coding is linear network coding. In some embodiments, the network coding is random linear network coding.

The client 110 has a media player 208, rate adaptation logic 204, and content access logic 206. The media player 208 is configured to play media such as video streams. Thus, the media player 208 is configured to play the media object.

The rate adaptation logic 204 is configured to measure the time it takes for the media segments to be provided to the media player 208, in one embodiment. Based on this time, the rate adaptation logic 204 determines a suitable bit rate for future media segments. For example, the rate adaptation logic 204 may select a media segment from the media manifest 215 having the highest bit rate that can be downloaded in time for playback without causing stalls or re-buffering.

The content access logic 206 is configured to request chunks of networked coded video that correspond to a media segment, in one embodiment. Note that the client 110 may request these chunks from more than one server 150. For example, the client 110 may send one request over a Wi-Fi connection, another request over a 4G LTE connection, etc. In one embodiment, these content request are "interests," as the term is used in CCN.

Note that the network coded ICN 202 does not necessarily provide the media segments 214 to the client 110. In some embodiments, the network coded ICN 202 provides network encoded chunks that are formed from a certain media segment. The client 110 re-assembles the media segment from the network encoded chunks. The client 110 may send requests for the network encoded chunks over multiple communication interfaces. This may enable the client 110 to, in effect, aggregate the bandwidth of the communication interfaces. The communication interfaces may be wireless (e.g., LTE, Wi-Fi).

Note there is no need for the client 110 to establish a TCP session. Also, there is no need for the client 110 to identify a specific server. The content can be requested from multiple interfaces of the client 110 at the same time. Because the returned content is network coded chuck, in one embodiment, client 110 may receive new information on each of the interfaces. However, client 110 does not require any synchronization between these interfaces. Each path (between content source and client 110) may have an unknown, varying bandwidth/latency. However, the link capacities of each interface add up. Rate adaptation 204 for video streaming can work on the aggregate capacity. It is not required to perform fine grained link-by-link rate adaptation.

Figure 3A:
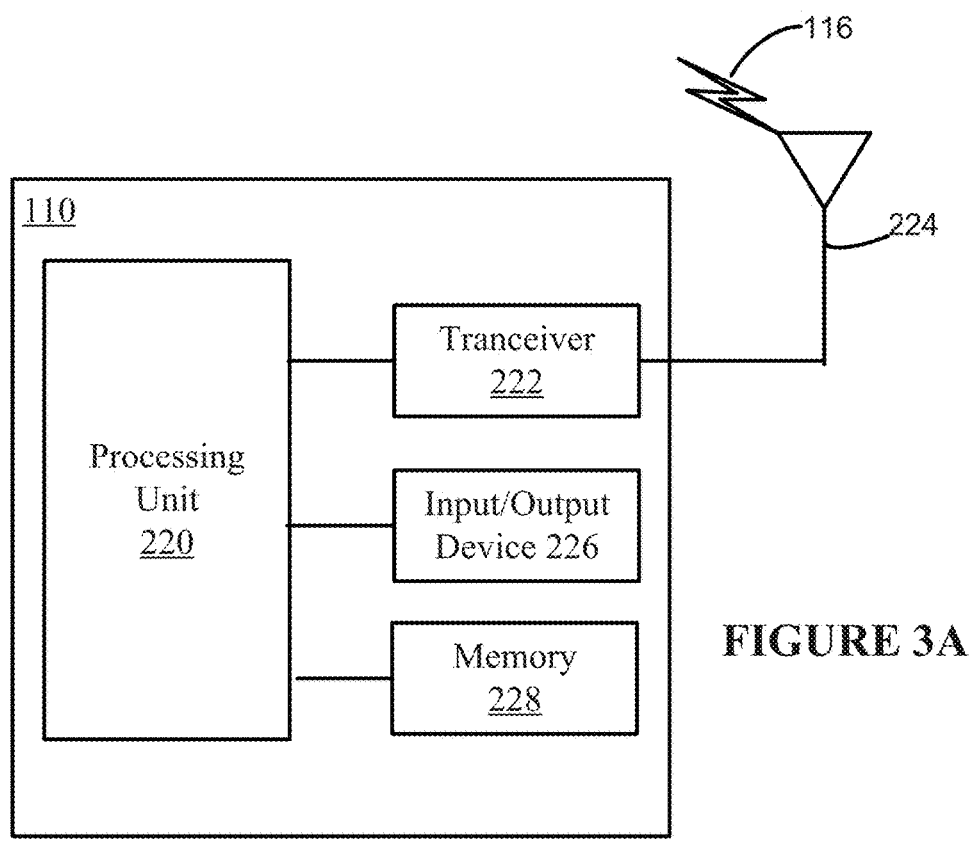
FIG. 3A depicts one embodiment of a UE.

FIG. 3A depicts one embodiment of a UE 110. As shown in FIG. 3A, the UE 110 includes at least one processing unit 220. The processing unit 220 implements various processing operations of the UE 110. For example, the processing unit 220 could perform signal coding, data processing, power control, input/output processing, or any other functionality enabling the UE 110 to operate in the communication system 100. The processing unit 220 also supports the methods and teachings described in more detail herein. Each processing unit 220 includes any suitable processing or computing device configured to perform one or more operations. Each processing unit 220 could, for example, include a microprocessor, microcontroller, digital signal processor, field programmable gate array, or application specific integrated circuit.

The UE 110 also includes at least one transceiver 222. The transceiver 222 is configured to modulate data or other content for transmission by at least one antenna 224. The transceiver 222 is also configured to demodulate data or other content received by the at least one antenna 224. Each transceiver 222 includes any suitable structure for generating signals for wireless transmission and/or processing signals received wirelessly. Each antenna 224 includes any suitable structure for transmitting and/or receiving wireless signals. One or multiple transceivers 222 could be used in the UE 110, and one or multiple antennas 224 could be used in the UE 110. Although shown as a single functional unit, a transceiver 222 could also be implemented using at least one transmitter and at least one separate receiver.

The UE 110 further includes one or more input/output devices 226. The input/output devices 226 facilitate interaction with a user. Each input/output device 226 includes any suitable structure for providing information to or receiving information from a user, such as a speaker, microphone, keypad, keyboard, display, or touch screen.

In addition, the UE 110 includes at least one memory 228. The memory is non-transitory memory storage, in one embodiment. The memory 228 stores instructions and data used, generated, or collected by the UE 110. For example, the memory 228 could store software or firmware instructions executed by the processing unit(s) 220 and data used to reduce or eliminate interference in incoming signals. Each memory 228 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 3B:
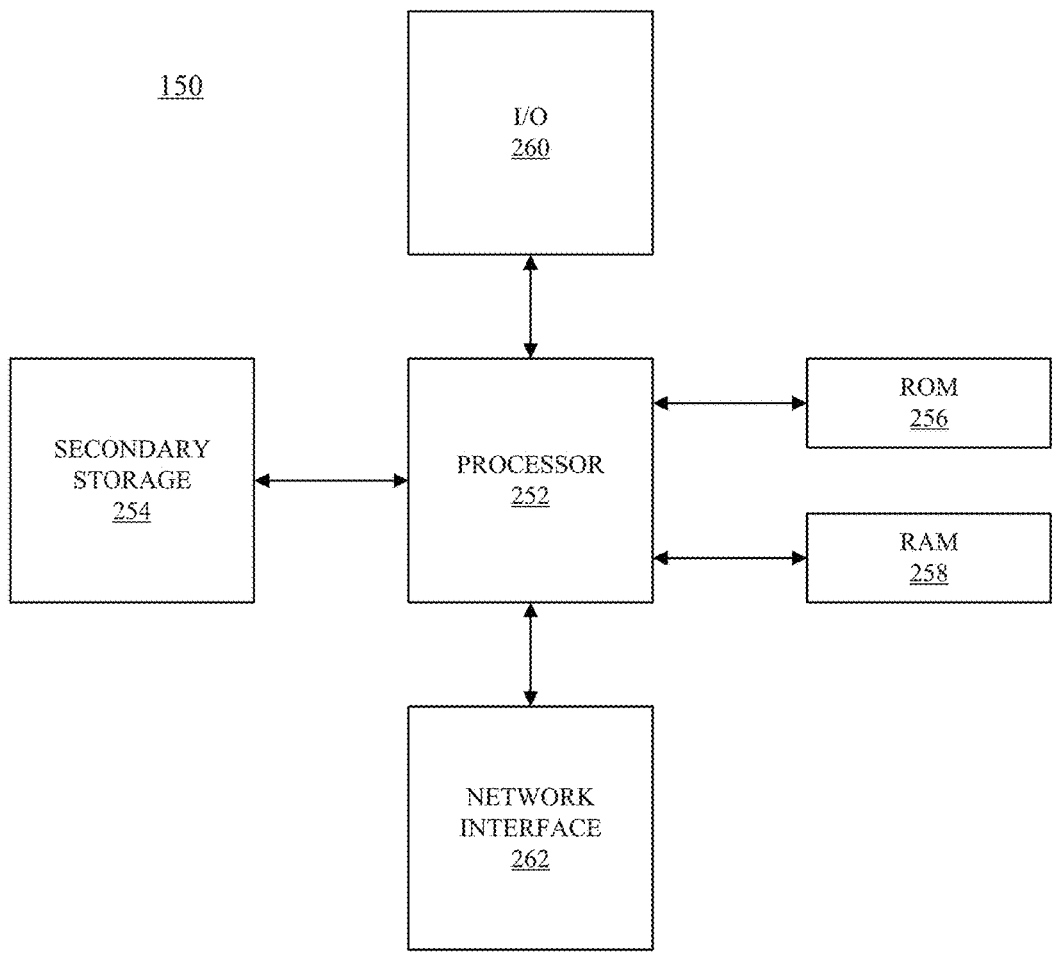
FIG. 3B illustrates a schematic diagram of a general-purpose network component or computer system.

FIG. 3B illustrates a schematic diagram of a general-purpose network component or computer system 150. The general-purpose network component or computer system 150 could be used in server 150 of FIG. 1A or 2. The general-purpose network component or computer system 150 might also be used for a manager node 104 or a content router 106 of FIG. 1B. The general-purpose network component or computer system 150 includes a processor 252 (which may be referred to as a central processor unit or CPU) that is in communication with memory devices including secondary storage 254, and memory, such as ROM 256 and RAM 258, input/output (I/O) devices 260, and a network interface 262. Although illustrated as a single processor, the processor 252 is not so limited and may comprise multiple processors. The processor 252 may be implemented as one or more CPU chips, cores (e.g., a multi-core processor), FPGAs, ASICs, and/or DSPs, and/or may be part of one or more ASICs.

The secondary storage 254 is typically comprised of one or more disk drives or tape drives and is used for non-volatile storage of data and as an over-flow data storage device if the RAM 258 is not large enough to hold all working data. The secondary storage 254 may be used to store programs that are loaded into the RAM 258 when such programs are selected for execution. The ROM 256 is used to store instructions and perhaps data that are read during program execution. The ROM 256 is a non-volatile memory device that typically has a small memory capacity relative to the larger memory capacity of the secondary storage 254. The RAM 258 is used to store volatile data and perhaps to store instructions. Access to both the ROM 256 and the RAM 258 is typically faster than to the secondary storage 254.

Figure 4A:
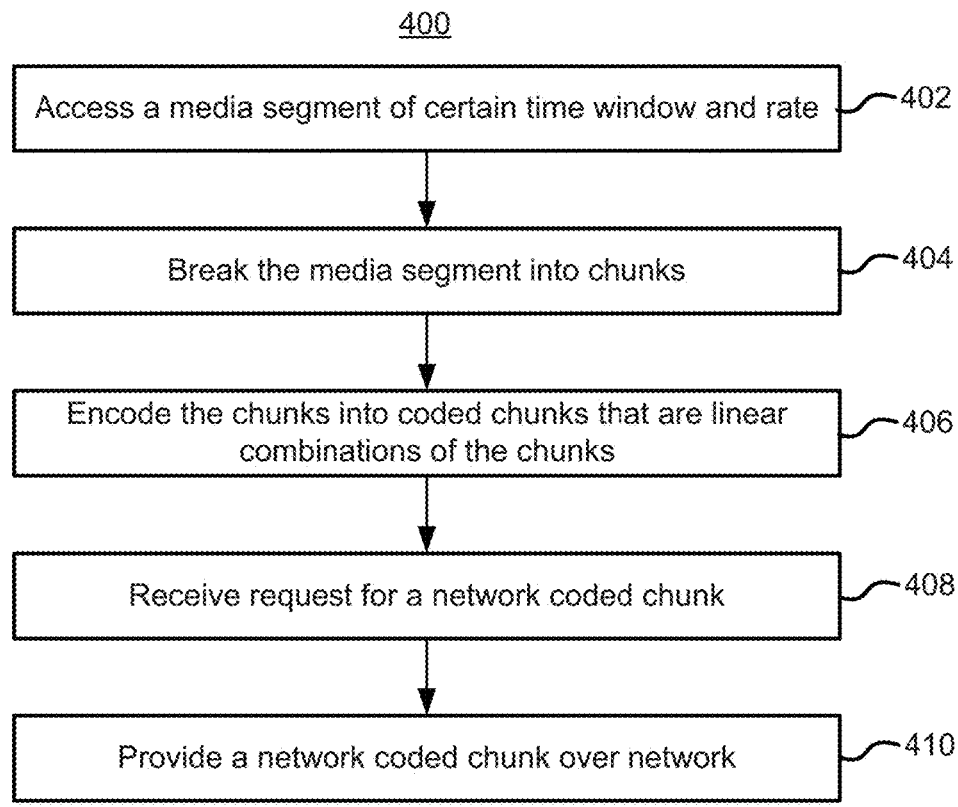
FIG. 4A is a flowchart illustrating one embodiment of a process of providing network encoded video in an ICN.
Figure 4B:
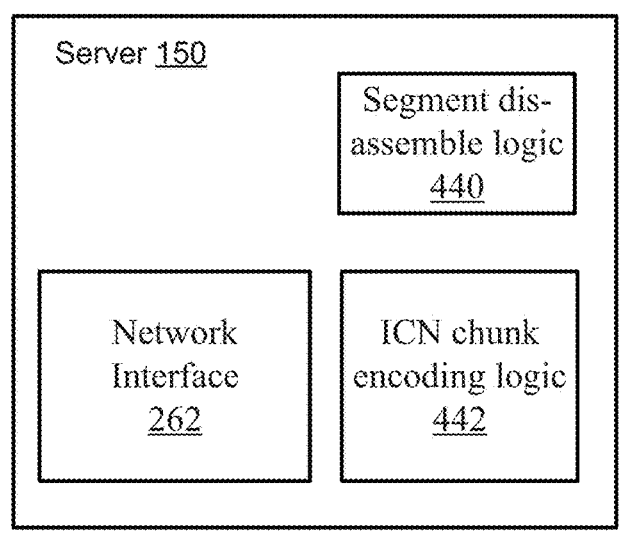
FIG. 4B is a block diagram of components of one embodiment of a server.
Figure 5:
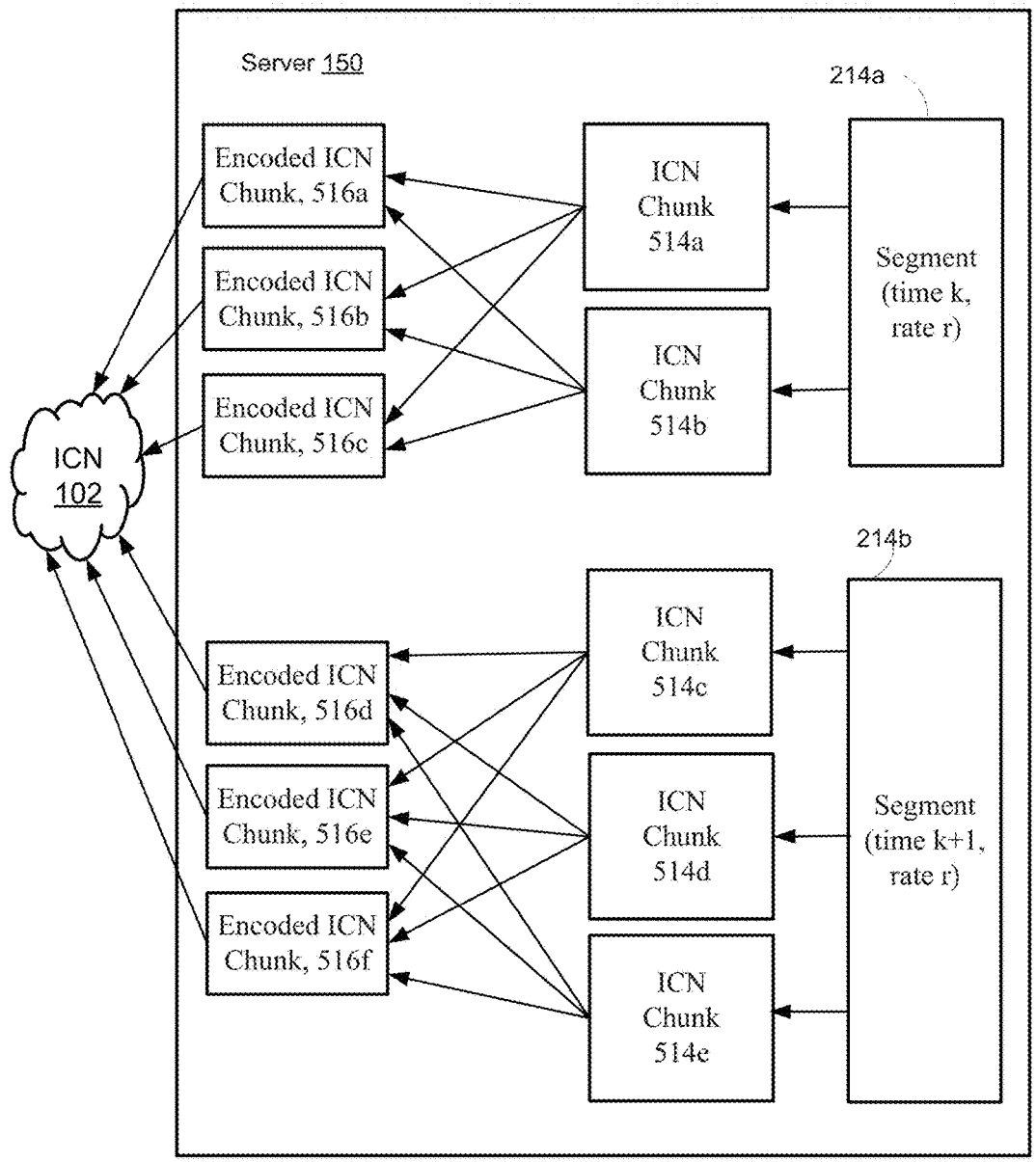
FIG. 5 depicts processing that occurs during one embodiment of network encoding at a server.

FIG. 4A is a flowchart illustrating one embodiment of a process 400 of providing network encoded video in an ICN. The process 400 is performed by server 150, in one embodiment. In the description of process 400, a server 150 performs the various steps. However, some or all of the steps could be performed by an electronic system other than a server. In one embodiment, the process 400 is performed by a manager node 104 in an ICN 102. In one embodiment, the process 400 is performed by a content router node 106 in an ICN 102. Process 400 describes processing for one media segment of some media object. The media object may comprise, for example, a video stream. Process 400 will be discussed with respect to FIGS. 4B and 5. FIG. 4B is a block diagram of components of one embodiment of a server 150. The server 150 has a communication interface 262, segment de-assemble logic, and ICN chunk encoding logic. FIG. 5 depicts processing that occurs during one embodiment of network encoding at a server 150.

In step 402, the server 150 accesses a segment 214 of a media object. The segment 214 is for some length of time of the media object (e.g., a length of time in the video stream). The segment is a video segment, in one embodiment. The segment has a certain rate associated with it, in one embodiment. The segment has a certain resolution associated with it, in one embodiment. As one example, the media segment may be a DASH segment. However, process 400 is not limited to DASH. With reference to FIG. 5, the server 150 accesses segment 214a for time "k". Each segment 214 may have a unique name associated with it such as, for example, "videstream_v/segment_n/rate_r". In this example, "videstream_v" is the name of the video stream, "segment_n" is the time window, "rate_r" is the bit rate.

In step 404, the media segment is broken into chunks. Herein, a "chunk" is a fragment of data. The chunk is not limited to any particular size. In one embodiment, the chunk is a fragment of a media segment. With reference to FIG. 5, segment 214a for time "k" is broken into two ICN chunks 514a and 514b. For the sake of discussion, a "CCN embodiment" will be discussed. However, process 400 is not limited to CCN. In a CCN embodiment, the media segment is broken into CCN chunks. Thus, in one embodiment, the ICN chunks are CCN chunks. The number of chunks into which the media segment is broken into may depend on the bit rate and/or the length of the window. Consider an example in which several media segments exist for the same time window. The window may be, for example, two seconds long. For the sake of discussion, there are media segments having a low bit-rate, medium bit-rate, and high bit-rate for this time interval. In this example, there may be more chunks for the higher bit rate segment, and fewer chunks for the lower bit rate segment.

Each ICN chunk 514a has a name that is based on the segment name, in one embodiment. For example, chunk 514a may be named, "videstream_v/segment_n/rate_r/chunk_a," and chunk 514b may be named, "videstream_v/segment_n/rate_r/chunk_b". In one embodiment, all of the ICN chunks 514 for a given segment have the same name.

In one embodiment, segment dis-assemble logic 440 performs step 404. Segment dis-assemble logic 440 may be implemented in hardware or software. In one embodiment, segment dis-assemble logic 440 comprises computer program instructions that are stored in non-transitory memory storage (e.g., ROM 256, RAM, 258, secondary storage 254). The segment dis-assemble logic 440 may further comprise processor 252. The computer program instructions may be software or firmware instructions, which may be executed by the processing unit(s) 220 to perform functionality of step 404.

In step 406, the chunks for the media segment are encoded into network encoded chunks. Step 406 may use "network coding". Linear network coding is one type of network coding in which linear combinations are used. With reference to FIG. 5, the two ICN chunks 514a, 514b for the segment 214a at time k are encoded into three encoded ICN chunks 516a-516c. The encoded ICN chunks 516 may also be referred to as network encoded chunks. In one embodiment, each of the encoded ICN chunks 516 is a linear combination of the ICN chunks 514 for that media segment. For example, encoded ICN chunk 516a may be 2*ICN chunk 514a+3 ICN chunk 514b; encoded ICN chunk 516b may be 3*ICN chunk 514a+5 ICN chunk 514b; encoded ICN chunk 516a may be 1*ICN chunk 514a+4 ICN chunk 514b. Each of the encoded ICN chunks 516a may be placed into a data packet. The header of the data packet contains information about the encoding, in one embodiment. For example, the header may specify coefficients that define the linear combination of ICN chunks 514 from which the encoded ICN chunks 516 was formed.

In one embodiment, ICN chunk encoding logic 442 performs step 406. ICN chunk encoding logic 442 may be implemented in hardware or software. In one embodiment, ICN chunk encoding logic 442 comprises computer program instructions that are stored in non-transitory memory storage (e.g., ROM 256, RAM, 258, secondary storage 254).

ICN chunk encoding logic 442 may further comprise processor 252. The computer program instructions may be software or firmware instructions, which may be executed by the processing unit(s) 220 to perform functionality of step 406.

In step 408, the server 150 receives a request for a network encoded chunk for the media segment. In one embodiment, this is a request for either ICN chunk 514a or 514b. The request includes a "name" for the data that is requested, in one embodiment. In one embodiment, this request is an interest, as the term is used in CCN. In one embodiment, this is a request for any of the encoded ICN chunks 516 for a given segment. As one example, the name may be "videstream_v/segment_n/rate_r/coded_chunk."

In step 410, the server 150 provides a network encoded chunk for the media segment. For example, the server 150 provides encoded ICN chunk 516a, as a data packet onto the ICN 102. In one embodiment, the server 150 sends one of the encoded ICN chunks 516a in response to one request for some named data in the ICN. However, it is also possible for the server 150 to send multiple encoded ICN chunks 516a in response to a single request for some named data in the ICN. The server provides an encoded ICN chunk in a data packet, in one embodiment. The server 150 sends only one encoded ICN chunk 516 per data packet, in one embodiment. In one embodiment, the server 150 uses communication interface 262 to send the network encoded chunk onto the ICN 102.

The server 150 may proceed in a similar manner with other segments such as segment 214b. Thus, segment 214b may be broken into ICN chunks 514c, 514d, and 514d. The server 150 may encode the ICN chunks 514c, 514d, and 514d into network encoded ICN chunks 516d, 516e, and 516f. The arrows between ICN chunks 514 and encoded ICN chunks 516 represent that, in one embodiment, the encoded ICN chunks 516 are linear combinations of the ICN chunks 514.

Figure 6:
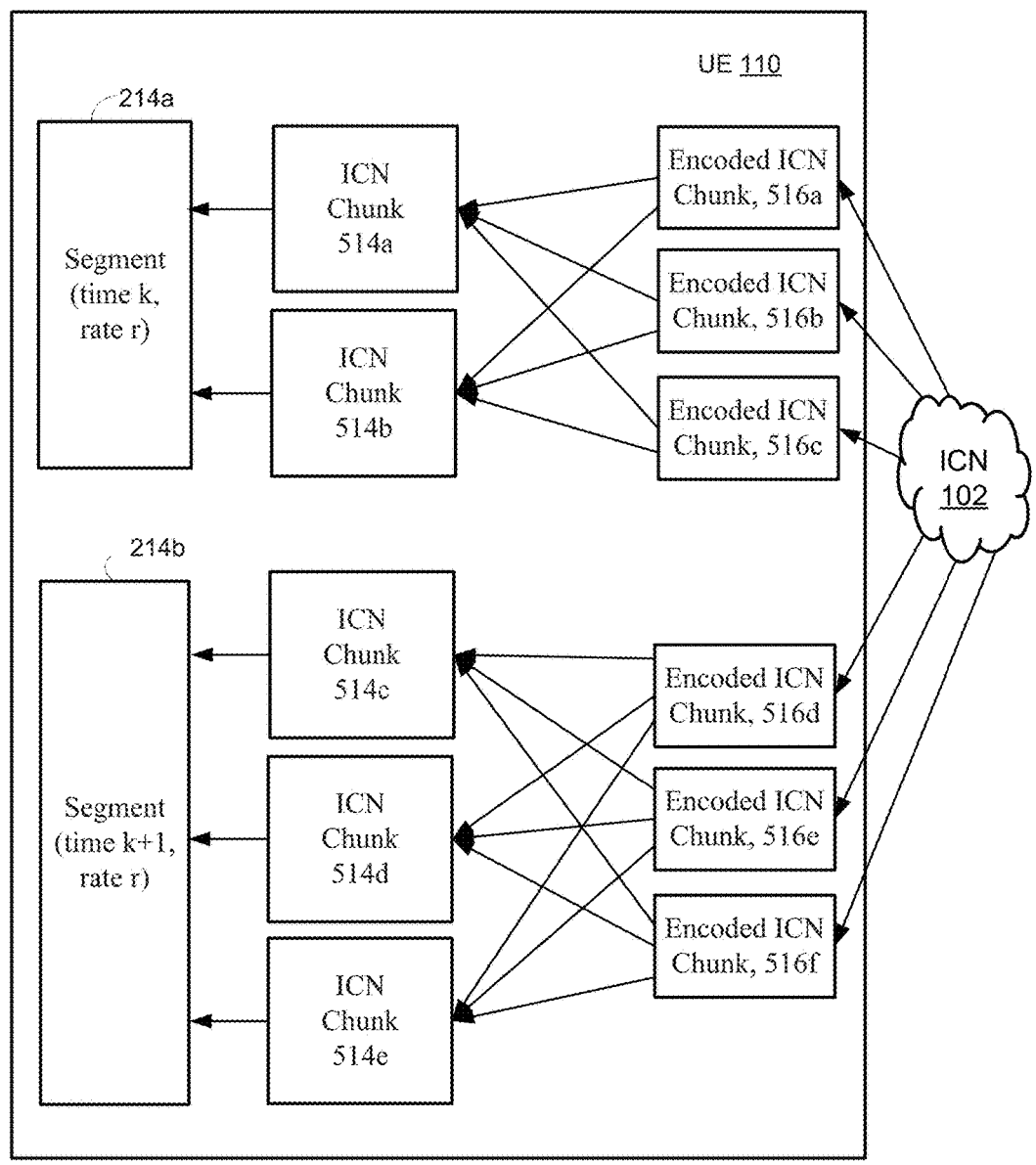
FIG. 6 is a diagram of one embodiment of processing network encoded chunks at a UE.

FIG. 6 is a diagram of one embodiment of processing network encoded chunks. In one embodiment, this processing occurs at a UE 110. The diagram is analogous to the server processing in FIG. 5. That is, the processing is for the same two media segments 214a, 214b. The UE 110 receives network encoded ICN chunks 516 from the ICN 102. Note that the encoded ICN chunks 516 are not required to all come from the same server 150. However, for the sake of discussion, the example on FIG. 6 shows the UE 110 receiving the encoded ICN chunks 516a-f. The UE 110 decodes encoded ICN chunks 516a-c into ICN chunks 514a, and 514b. The UE 110 recreates the media segment 214a from ICN chunks 514a, and 514b. Processing is similar for encoded ICN chunks 516d-f to obtain ICN chunks 514c-514e, and then segment 214b.

Figure 7:
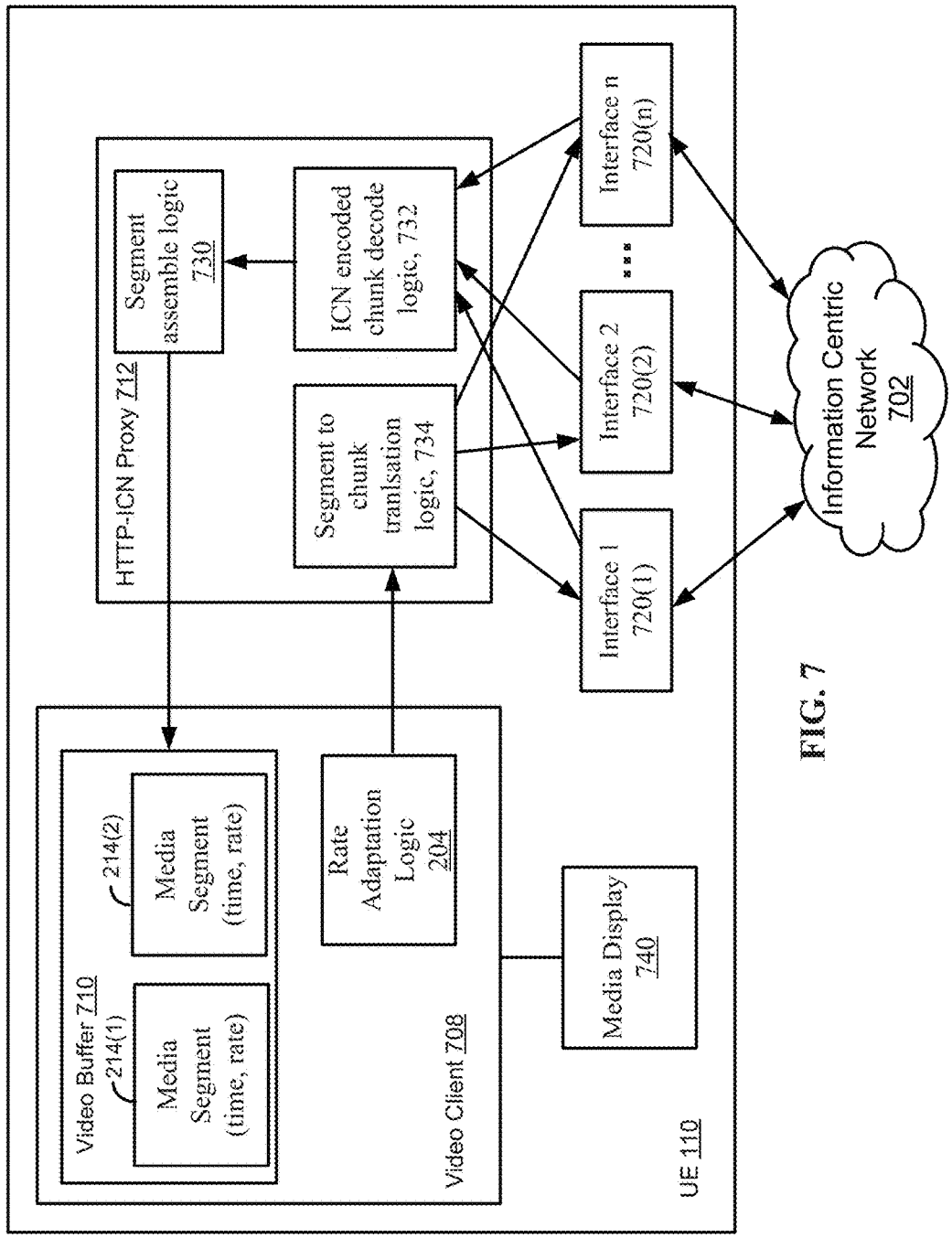
FIG. 7 is a diagram of one embodiment of a UE in communication with a network coded ICN.

FIG. 7 is a diagram of one embodiment of a UE 110 in communication with a network coded ICN 702. This diagram will be used to help illustrate how a UE 110 may request and process network encoded chunks. The UE 110 has a video client 708, HTTP-ICN Proxy 712, and several network interfaces 720(1)-720(n). The video client 708 has a video buffer 710 and rate adaptation logic 204. Video buffer 710 presently holds media segments 214(1) and 214(2). Each is for some specific time interval (time) and is associated with some bit rate (rate). The video client 708 is configured to request that the HTTP-ICN proxy 712 obtain a media segment. In one embodiment, this request is for an HTTP-based media segment. The HTTP-ICN Proxy 712 is configured to translate this request into a request for an encoded ICN chunk 516, in one embodiment. In a CCN embodiment, this is a network coded CCN chunk. The UE 110 has a variety of network interfaces 720(1)-720(n), each of which is able to communicate with the ICN 702. Examples of the network interfaces include, but are not limited to, 5G, 4G/LTE, and Wi-Fi.

Note that the UE 110 is able to exploit multi-path connectivity to obtain media segments, in one embodiment. For example, the UE 110 may exploit the various network interfaces 720 to obtain network encoded chunks 516 from potentially different locations. This content can be requested asynchronously. For example, the UE 110 can obtain linearly independent network encoded chunks associated with a specific segment from different network interfaces 720, and combine them to obtain that specific segment.

The HTTP-ICN proxy 712 may be implemented in hardware or software. In one embodiment, HTTP-ICN proxy 712 comprises a non-transitory memory storage (e.g., memory 228) that contains computer program instructions, which when executed on processing unit 220 perform functionality of the HTTP-ICN proxy 712.

Figure 8:
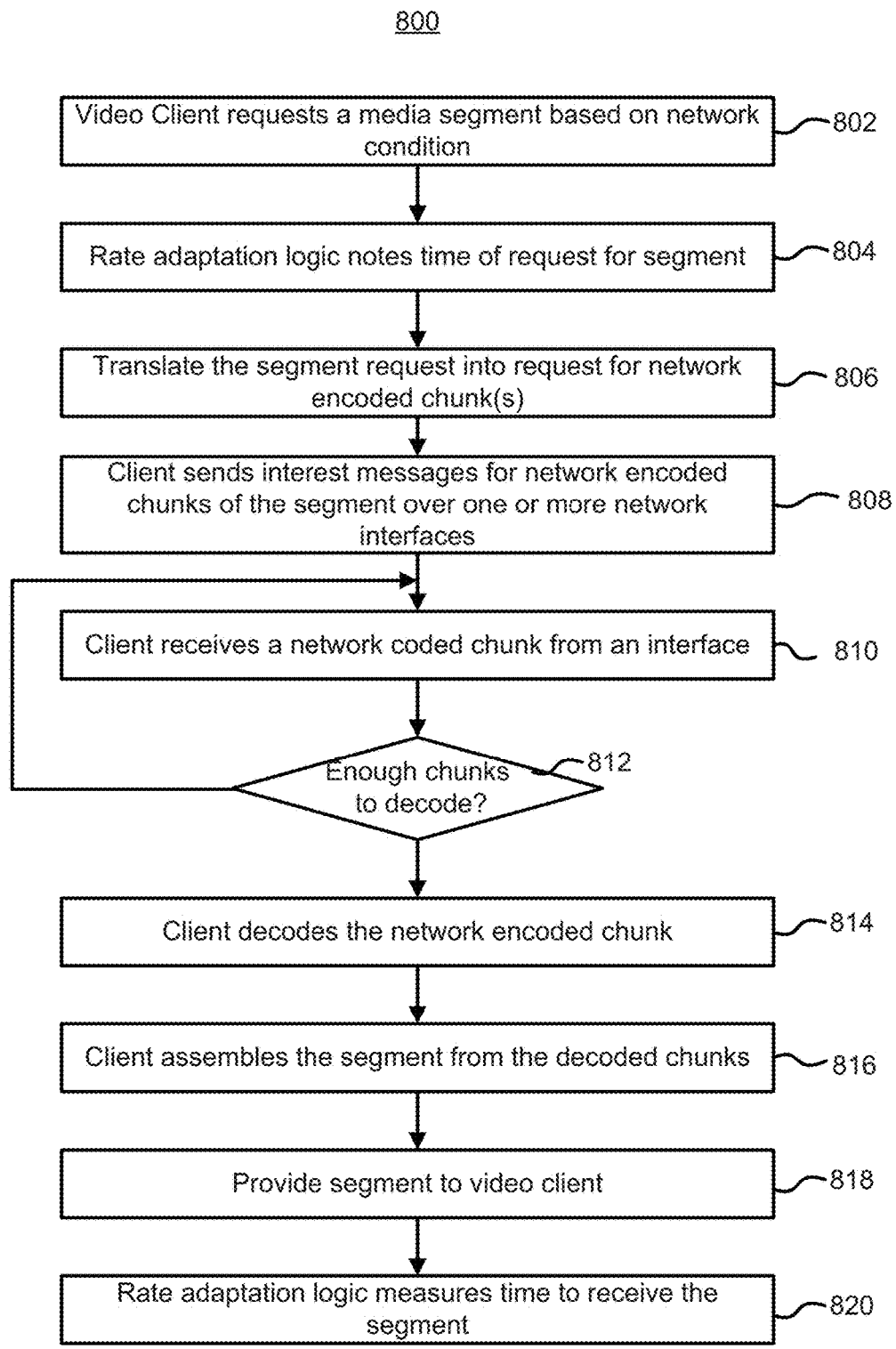
FIG. 8 is a flowchart of one embodiment of a process of a UE processing network encoded video chunks.

FIG. 8 is a flowchart of one embodiment of a process 800 of a UE 110 processing network encoded video chunks. Process 800 will be described with respect to the UE 110 of FIG. 7, but is not limited to the embodiment of FIG. 7. In step 802, the video client 708 requests a media segment 214 based on network conditions. For example, the rate adaptation logic 204 determines the highest bit rate that could be downloaded within an acceptable time frame. In one embodiment, the video client 708 accesses a media manifest 215 to determine which media segment to request. In one embodiment, the video client 708 obtains a name for the media segment from media manifest 215. In one embodiment, the video client 708 makes an HTTP GET request. With reference to the example in process 400, the request can have an identifier, such as, "videostream_v/segment_n/rate_r", if the client want to obtain segment 214a.

In step 804, the rate adaptation logic 704 notes the time of the request for the media segment.

In step 806, the HTTP-ICN proxy 712 translates the request for a media segment into a request for one or more network encoded chunks of media content. In one embodiment, the request for the media segment is translated into an "interest" in the ICN network. The interest may have a name associated with it. In one embodiment, this is a CCN interest. In one embodiment, an HTTP GET request is translated into a CCN name. This may include modifying the identifier in the request. For example, a name such as, "videostream_v/segment_n/rate_r/chunk_a" or "videostream_v/segment_n/rate_r/chunk" or "videostream_v/segment_n/rate_r/coded_chunk" may be generated to create a request for a network encoded chunk.

In step 808, one or more network interfaces 720 each forward an interest message to the ICN 702. The HTTP-ICN proxy 712 informs each network interface 720 what the name of the interest is, in one embodiment. Thus, the UE 110 may send out the same interest request via different network interfaces 720. For example, one interest request may be sent via a Wi-Fi interface, another via an LTE interface.

In step 810, the UE 110 receives a network encoded chunk 516 over the ICN 102 from one of the interfaces 720(1)-720(n).

In step 812, the UE 110 determines whether there are enough network encoded chunks 516 for this media segment to be able to decode into ICN chunks 514. For example, referring to FIG. 6, the UE 110 may be attempting to obtain ICN chunks 514a and 514b. The network encoded chunks 516 may have arrived from different servers 150. Note that it is possible to recover ICN chunks 514a and 514b without having all of the network encoded chunks 516a-c. For example, the UE 110 may be able to recover ICN chunks 514a and 514b from network encoded chunk 516a and one or more network encoded chunks from some other server.

In there are not yet enough network encoded chunks 516 to be able to decode into the ICN chunks 514, then the UE 110 waits for another network encoded chunk 516. When there are enough network encoded chunks 516 to be able to decode into the ICN chunks 514, the UE 110 does so in step 814. For example, the HTTP-ICN proxy 712 forms ICN chunk 514a and 514b from various network encoded chunks 516. Note that the network encoded chunks 516 are not necessarily chunks 516a-516c, as some other combination of network encoded chunks 516 may be suitable to decode into ICN chunks 514a and 514b.

In step 816, the UE 110 assembles the media segment from the ICN chunks 514. Referring to FIG. 6, as one example, the UE 110 assembles segment 214a from ICN chunks 514a and 514b.

In step 818, the video segment is provided to the video client. For example, the HTTP-ICN proxy may assemble the media segment and provide it to the video client 708, which may store the media segment 214 in the video buffer 710

In step 820, the rate adaptation logic 204 measures the time to receive the media segment. Note that the various network encoded chunks 516 may have been received over more than one interface 720. However, the rate adaptation logic 204 need not consider the individual interfaces 720. Instead, the rate adaptation logic 204 may, in effect, treat the aggregation of the various physical interfaces 720 as a logical interface. The rate adaptation logic 204 may then use time to receive the media segment to determine a suitable rate (e.g., bits/second) for a media segment to be requested.

Figure 9:
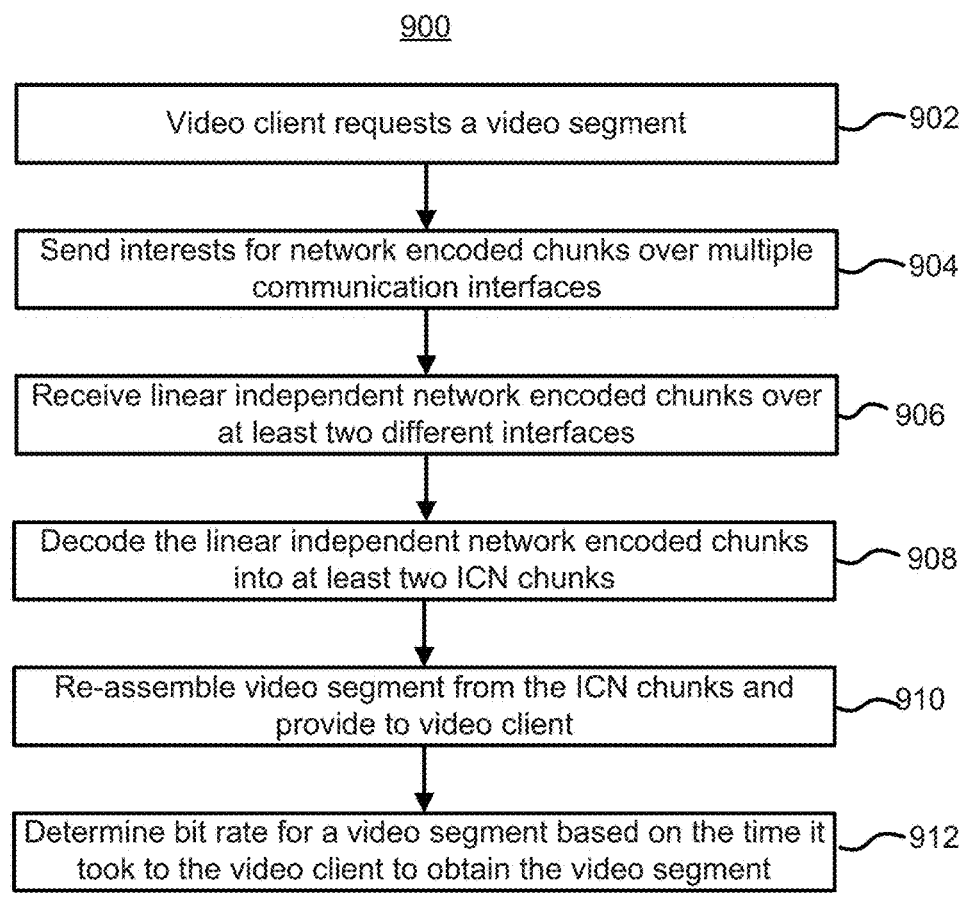
FIG. 9 is a flowchart of one embodiment of a process of performing rate adaptation at a UE.

FIG. 9 is a flowchart of one embodiment of a process 900 of performing rate adaptation at a UE 110. Process 900 will be described with reference to FIG. 7, but is not so limited. Step 902 includes a video client 708 requesting a video segment. In one embodiment, this is an HTTP-based video segment. This is a DASH segment, in one embodiment.

In step 904, the UE 110 sends interest requests for network encoded chunks over multiple network interfaces 720.

In step 906, the client 110 receives linearly independent network encoded chunks over at least two different network interfaces 720. Note that these are for the video segment from the request in step 902. For example, the client 110 receives a first network encoded chunk 514 over a Wi-Fi interface, and a second network encoded chunk 514 over a LTE interface. As another example, when the UE 110 is moving, the client may be handed off from one base station 114 to another base station 114. During this hand-off, the UE 110 may at least temporarily be connected to two different base stations 114 at the same time. The UE 110 may receive a first network encoded chunk 514 from one base station 114 and a second (linearly independent chunk) from another base station 114.

In step 908, the UE 110 decodes the linearly independent network encoded chunks to produce the original chunks for this video segment. The UE 110 may do so using header information in data packets of the network encoded chunks.

In step 910, the UE 110 re-assembles the requested video segment from the original chunks (from step 908).

In step 912, the rate adaptation logic 204 determines a bit rate for a new video segment, based on the time between the video client request for the video segment and when the video segment was provided to the video client. Note that this allows the client 110 to perform rate adaptation without sending a request for the video segment onto a network and receiving the actual video segment from the network. Also, the UE 110 need not consider the time it takes for the individual network encoded chunks 514 to be downloaded to the UE 110.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a non-transitory memory storage comprising instructions;
a plurality of communication interfaces, including at least two different types of communication interfaces; and
one or more processors in communication with the plurality of communication interfaces and the non-transitory memory storage, wherein the one or more processors execute the instructions to:
access a request from a video client for a video segment from;
convert the request for the video segment into a request for an interest in an information centric network (ICN);
forward interest requests to the ICN over the at least two different types of communication interfaces;
receive network encoded ICN chunks over ones of the at least two different types of communication interfaces in response to the interest requests;
decode the network encoded ICN chunks into ICN chunks;
assemble the ICN chunks into the video segment; and
provide the video segment to the video client.

2. The apparatus of claim 1, wherein the request for a video segment is a request for an HTTP-based video segment.

3. The apparatus of claim 1, wherein the ICN is a content centric network (CCN).

4. The apparatus of claim 1, wherein the one or more processors execute the instructions to:
receive a first network encoded chunk over a first of the at least two different types of communication interfaces;
receive a second network encoded chunk over a second of the at least two different types of communication interfaces; and
form an ICN chunk from the first network encoded chunk and the second network encoded chunk.

5. The apparatus of claim 4, wherein the one or more processors execute the instructions to:
perform video bit-rate adaptation based on the time between a request for the video segment and the time the video segment is re-assembled, wherein the video segment was re-assembled based on the first network encoded chunk and the second network encoded chunk.

6. The apparatus of claim 1, wherein the one or more processors execute the instructions to:
perform video bit-rate adaptation based on the time between a request for the video segment and the time the video segment is re-assembled, wherein the apparatus does not send a request for the video segment over a communications network and does not receive the video segment over any of the plurality of communication interfaces.

7. A method comprising:
accessing a request from a video client of a client system for a video segment;
converting the request for the video segment into a request for an interest in an information centric network (ICN);
forwarding interest requests to the ICN over at least two different types of communication interfaces of the client system;
receiving network encoded ICN chunks over ones of the at least two different types of communication interfaces in response to the interest requests;
decoding, by the client system, the network encoded ICN chunks into ICN chunks;
assembling, by the client system, the ICN chunks into the video segment; and
providing the video segment to the video client.

8. The method of claim 7, wherein the request for a video segment is a request for an HTTP-based video segment.

9. The method of claim 7, wherein the ICN is a content centric network (CCN).

10. The method of claim 7, wherein:
receiving the network encoded ICN chunks over ones of the at least two different types of communication interfaces in response to the interest requests comprises:
receiving a first network encoded chunk over a first of the at least two different types of communication interfaces; and
receiving a second network encoded chunk over a second of the at least two different types of communication interfaces; and
decoding the network encoded ICN chunks into ICN chunks comprises forming an ICN chunk from the first network encoded chunk and the second network encoded chunk.

11. The method of claim 10, further comprising:
performing video bit-rate adaptation based on the time between a request for the video segment and the time the video segment is re-assembled, wherein the video segment was re-assembled based on the first network encoded chunk and the second network encoded chunk.

12. The method of claim 7, further comprising:
performing video bit-rate adaptation based on the time between a request for the video segment and the time the video segment is re-assembled, wherein the client system does not send a request for the video segment over a communications network and does not receive the video segment over any of the at least two different types of communication interfaces.

13. A non-transitory computer-readable medium storing computer instructions for providing a video segment to a video client of a client system, that when executed by one or more processors, cause the one or more processors to:
access a request from the video client for the video segment;
convert the request for the video segment into a request for an interest in an information centric network (ICN);
forward interest requests to the ICN over at least two different types of communication interfaces of the client system;
receive network encoded ICN chunks over ones of the at least two different types of communication interfaces in response to the interest requests;
decode the network encoded ICN chunks into ICN chunks;
assemble the ICN chunks into the video segment; and
provide the video segment to the video client.

14. The non-transitory computer-readable medium of claim 13, wherein the request for a video segment is a request for an HTTP-based video segment.

15. The non-transitory computer-readable medium of claim 13, wherein the ICN is a content centric network (CCN).

16. The non-transitory computer-readable medium of claim 13, wherein the computer instructions, that when executed by the one or more processors, cause the one or more processors to:
receive a first network encoded chunk over a first of the at least two different types of communication interfaces;
receive a second network encoded chunk over a second of the at least two different types of communication interfaces; and
form an ICN chunk from the first network encoded chunk and the second network encoded chunk.

17. The non-transitory computer-readable medium of claim 16, wherein the computer instructions, that when executed by the one or more processors, further cause the one or more processors to:
perform video bit-rate adaptation based on the time between a request for the video segment and the time the video segment is re-assembled, wherein the video segment was re-assembled based on the first network encoded chunk and the second network encoded chunk.

18. The non-transitory computer-readable medium of claim 16, wherein the computer instructions, that when executed by the one or more processors, further cause the one or more processors to:
perform video bit-rate adaptation based on the time between a request for the video segment and the time the video segment is re-assembled, wherein the client system does not send a request for the video segment over a communications network and does not receive the video segment over any of the at least two different types of communication interfaces.

* * * * *